Patented June 4, 1946

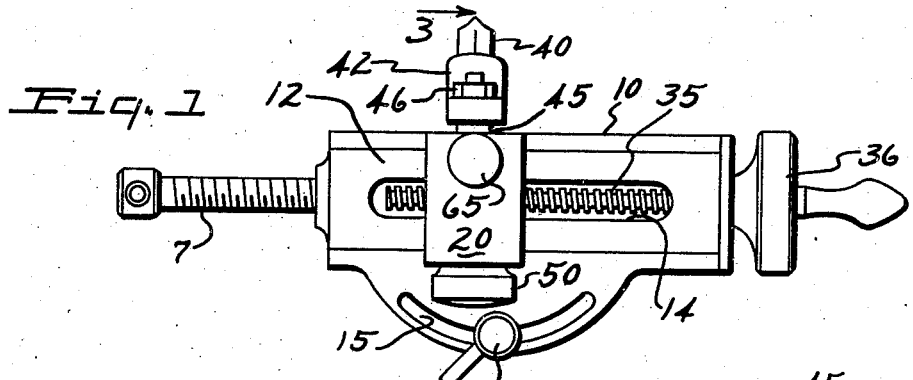
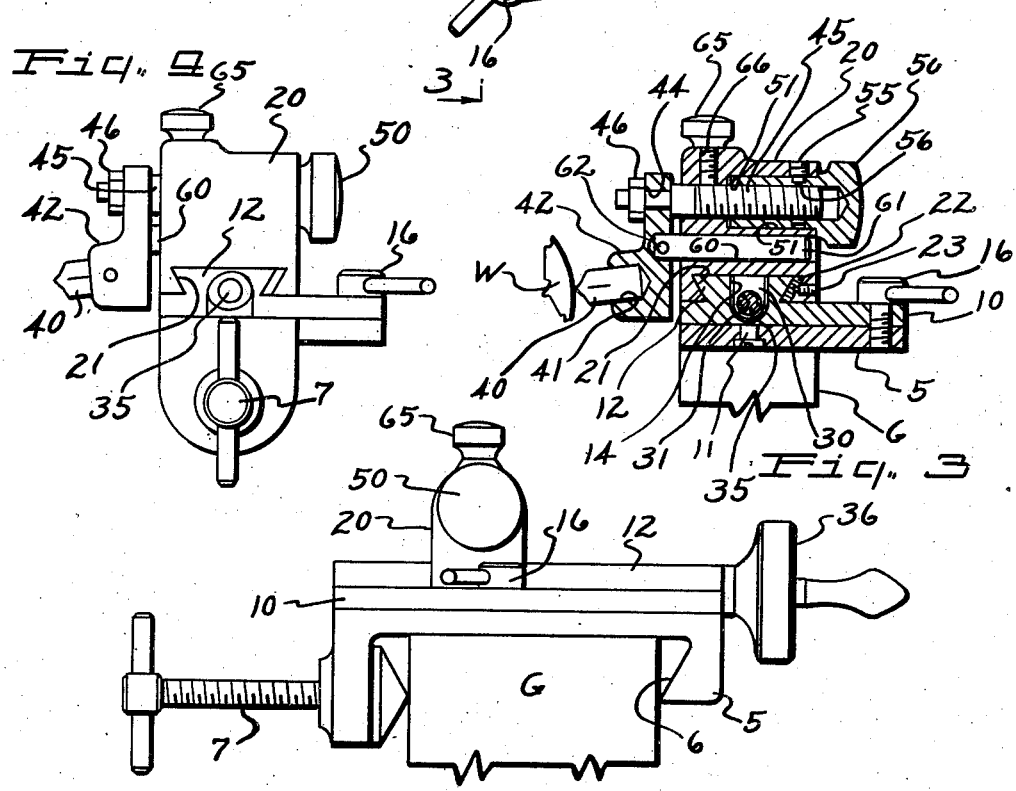

2,401,594

UNITED STATES PATENT OFFICE 2,401,594

GRINDER WHEEL DRESSING ATTACHMENT

Frank C. Wallace, North Hollywood, Calif.

Application May 13, 1944, Serial No. 535,416

3 Claims. (Cl. 125—11)

This invention relates to devices for dressing and trueing the abrasive wheels of grinders.

It is an object of the invention to provide a device of this character which may be readily clamped on to a bench grinder or the like to dress the abrasive wheel and which may be readily detached therefrom.

It is another object of the invention to provide an attachment of this character which is extremely simple and economical of construction and which, despite its simplicity, is capable of extremely fine adjustment and is capable of being positively maintained in adjusted position to insure uniform accuracy of the dressing operation.

It is another object to provide a dressing attachment for grinders which is capable of maximum adjustment relative to the grinder upon which it is mounted.

The invention possesses other advantageous features which will appear from the following description of a presently preferred embodiment, for the purposes of which description I shall refer to the accompanying drawing, in which:

Fig. 1 is a top plan view;
Fig. 2 is a side elevation;
Fig. 3 is a section on line 3—3 of Fig. 1; and
Fig. 4 is an end elevation.

In the drawing, G denotes a table, for instance, of a conventional bench grinder, having an abrasive wheel W.

My dressing attachment includes a base 5 having a longitudinal slot 6 to receive the portion of the grinder table G to which the device is to be clamped. A clamp screw 7 is provided to clamp the base on to the table.

A head mounting plate 10 is pivotally mounted on the base by means of pivot pin 11. The plate 10 presents a longitudinally disposed dove-tail 12 which is longitudinally slotted at 14, and the plate has an arcuate slot 15 through which the angle adjustment screw 16 extends, the latter screw being threaded into the base 5. The slot 15 and screw 16 are provided for the purpose of permitting trueing adjustment after the device is clamped on to the table—that is, adjustment of the angle at which the dressing tool is disposed relative to the grinder wheel.

A traveling head 20 has a dove-tail groove 21 in its bottom to slidably receive the dove-tail 12 of the mounting plate, a gib 22 and set screw 23 being provided to lock the head in adjusted position on the mounting plate.

A depending lug 30 has a transversely disposed, threaded opening 31 to threadedly receive the feed screw 35, which latter has on its outer end a hand-operated wheel 36. Thus, when the screw 35 is rotated, the head 20 is caused to travel longitudinally of the mounting plate 10, or transversely of the periphery of the abrasive wheel W.

A diamond dressing tool 40 is secured in the socket 41 of a dresser tool retaining arm 42, the latter having a hole 44 by which it is mounted on the reduced diameter end of a depth adjusting screw 45, being retained on the latter screw by means of a nut 46. A screw-actuating nut 50 is rotatably mounted in the enlarged bore 51 in the head, the nut 50 being rotatable but being held against longitudinal movement in the bore by means of a set screw 55 projecting into an annular groove 56 in the nut. A second and parallel transverse bore 60 is provided through the head to slidably receive a guide pin 61, which pin is secured at its outer end in a recess in the arm 42 by means of a cross pin 62. A lock screw 65 is threadedly mounted in hole 66 in the head for locking engagement with the depth adjusting screw 45 after the latter has been adjusted.

From the foregoing it will be noted that the attachment may be readily clamped on to the table of a grinder device and, before the main adjustment is commenced, the angle at which the dressing tool is disposed with reference to the grinder wheel may be trued or adjusted by means of swinging the mounting plate 10 about the pivot pin 11 and clamping the plate in the adjusted position by means of the clamp screw 16. The depth of cut of the dressing tool may be readily and meticulously adjusted by rotation of the nut 50, and the adjusting screw may be locked in said position by the lock screw 65, after which the hand wheel is operated to rotate the feed screw and cause the head to travel across the abrasive wheel periphery as desired.

I find the described construction of the dressing tool retaining arm and its means of being adjusted and guided in relation to the wheel to be conducive to both facility and accuracy of operation.

While, in the foregoing, I have resorted to considerable detail of structure and association of parts in describing a particular example of my invention, I wish it to be understood that I have done so merely to make my invention understood and that I do not limit my invention to such details. On the contrary, my invention is only to be limited as appears in the appended claims.

I claim:

1. A dressing device for the abrasive wheel of a grinding apparatus, comprising a bed adapted to be detachably secured to the apparatus, a mounting plate pivotally mounted on the bed to swing in a plane parallel to the bed, means for locking the plate against said swinging movement, a travelling head mounted on the plate for movement longitudinally thereof, a feed screw for so moving the head, a transverse bore in the head, a depth adjusting screw longitudinally slidably mounted in the bore, means threadedly engaging the screw to slide the latter in the bore, a tool retaining arm secured at one end on the outer end of the screw, a dressing tool carried by the other end of the arm, and pin means slidably engaging the head and cooperating with the arm between the depth-adjusting screw and dressing tool to prevent swinging movement of the latter relative to the head.

2. A dressing device for the abrasive wheel of a grinding apparatus, comprising a bed adapted to be detachably secured to the apparatus, a mounting plate pivotally mounted on the bed to swing in a plane parallel to the bed, means for locking the plate against said swinging movement, a travelling head mounted on the plate for movement longitudinally thereof, a feed screw for so moving the head, a transverse bore in the head, a depth adjusting screw longitudinally slidably mounted in the bore, means threadedly engaging the screw to slide the latter in the bore, a tool retaining arm secured at one end on the outer end of the screw, a dressing tool carried by the other end of the arm, and means slidably engaging the head and cooperating with the arm between the depth-adjusting screw and dressing tool to prevent swinging movement of the latter relative to the head, said last-named means comprising a transverse bore in the head parallel to the first-named bore, and a guide pin slidably mounted in said bore and means securing the outer end of the guide pin to the arm.

3. A dressing device for the abrasive wheel of a grinding apparatus, comprising a bed adapted to be detachably secured to the apparatus, a mounting plate pivotally mounted on the bed to swing in a plane parallel to the bed, an arcuate slot in the plate, clamping screw means disposed through the slot and threadedly engaging the bed to lock the plate against said swinging movement, a dovetail guide projecting upwardly from the plate, a longitudinal slot in said guide, a traveling head presenting a dovetailed way to slidably receive said guide, and a depending lug extending into and being movable along said last-named slot, a transverse threaded hole through the lug, a feed screw threadedly mounted in said hole and journalled in the plate, a bore through the head at right angle to said hole, a depth adjusting screw slidably mounted in the bore, a nut rotatably secured in the bore and threadedly engaging the last-named screw, a tool-retaining arm secured on the outer end of the depth-adjusting screw, a dressing tool carried by the outer end of said arm, a second bore in the head parallel to the first-named bore, a guide pin slidably mounted in the second bore and engaging the arm between the last-named screw and the dressing tool to prevent swinging movement of the latter relative to the head, and means independent of the feed screw for locking the head in position on the mounting plate.

FRANK C. WALLACE.